US012561945B1

(12) United States Patent
Picciolo et al.

(10) Patent No.: US 12,561,945 B1
(45) Date of Patent: Feb. 24, 2026

(54) SYSTEM AND METHOD FOR DETECTION AND CLASSIFICATION USING A STATISTICAL FEATURE VECTOR

(71) Applicant: Anduril Industries, Inc., Costa Mesa, CA (US)

(72) Inventors: Michael Lee Picciolo, Leesburg, VA (US); Wilbur Leon Myrick, Gainesville, VA (US); Jay Scott Goldstein, Great Falls, VA (US)

(73) Assignee: ANDURIL INDUSTRIES, INC., Costa Mesa, CA (US)

( * ) Notice: Subject to any disclaimer, the term of this patent is extended or adjusted under 35 U.S.C. 154(b) by 316 days.

(21) Appl. No.: 18/305,923

(22) Filed: Apr. 24, 2023

Related U.S. Application Data

(60) Provisional application No. 63/337,926, filed on May 3, 2022.

(51) Int. Cl.
*G06V 10/75* (2022.01)
*G01S 13/90* (2006.01)

(52) U.S. Cl.
CPC ............ *G06V 10/758* (2022.01); *G01S 13/90* (2013.01)

(58) Field of Classification Search
CPC ............................... G06V 10/758; G01S 13/90
See application file for complete search history.

(56) References Cited

U.S. PATENT DOCUMENTS

| | | | | |
|---|---|---|---|---|
| 6,628,844 B1 * | 9/2003 | Benitz | ................. | G01S 13/9011 |
| | | | | 382/280 |
| 2007/0116374 A1 * | 5/2007 | Despain | ............. | H03H 21/0029 |
| | | | | 382/265 |
| 2012/0249361 A1 * | 10/2012 | Sahinoglu | ........... | G01S 13/5244 |
| | | | | 342/159 |
| 2017/0168988 A1 * | 6/2017 | Sud | ........................ | G06F 17/141 |
| 2020/0401617 A1 * | 12/2020 | Spiegel | ................. | G06F 16/587 |

FOREIGN PATENT DOCUMENTS

CN          105205484  A  * 12/2015

OTHER PUBLICATIONS

Liu et al, Statistical Convolutional Neural Network for Land-Cover Classification From SAR Images, 2020, IEEE Geoscience and Remote Sensing Letters, 17(9): 1548-1552 (Year: 2020).*

(Continued)

*Primary Examiner* — Kathleen M Broughton
(74) *Attorney, Agent, or Firm* — Knobbe, Martens, Olson & Bear, LLP

(57) ABSTRACT

The present application discloses a method, system, and computer system for performing object detection and/or classification. The method includes (i) obtaining sensor data, (ii) processing the sensor data to obtain hypercube data representing the sensor data, (iii) transforming a data representation of the sensor data to obtain a statistical feature vector representing the sensor data, wherein the data representation is transformed based at least in part on processing the data representation using a Multistage Wiener Filter (MWF), (iv) performing an object detection and/or classification based at least in part on analyzing the statistical feature vector using a machine learning model, and (v) providing an indication of the object detection and/or classification.

26 Claims, 11 Drawing Sheets

(56) References Cited

OTHER PUBLICATIONS

Adarsha et al, Multistage Weiner Filter STAP Algorithm for Non-Side-Looking Radar, 2016, DOI: 10.1109/INDICON.2016.7839053, pp. 1-7. (Year: 2016).*

Hiemstra et al, Robust rank selection for the Multistage Wiener Filter, 2002, IEEE International Conference on Acoustics, Speech and Signal Processing, pp. 1-5. (Year: 2002).*

Sisterson et al, Architecture for Semi-Automated Radar Image Exploitation, 1998, Lincoln Laboratory Journal 11(2): 175-205. (Year: 1998).*

Liang et al, Feature Fusion-Net Using Deep Spatial Context Encoder and Nonstationary Joint Statistical Model for High Resolution SAR Image Classification, 2021, arXiv:2105.04799, pp. 1-18. (Year: 2021).*

Satyaprasad et al, Autofocusing SAR Images using Multistage Wiener Filter, 2016, IEEE International Conference on Recent Trends in Electronics Information Communication Technology, pp. 1-6. (Year: 2016).*

Gui et al, A Data Cube Model for Analysis of High Volumes of Ambient Data, 2012, Procedia Computer Science 10 (2012) 94-101. (Year: 2012).*

Grimm et al, Phase reference for the generalized multchannel Wiener filter, 2016, EURASIP J. on Advances in Signal Processing 2016:78. (Year: 2016).*

Gerald R. Benitz, "High-Definition Vector Imaging for Synthetic Aperture Radar", IEEE, 1998.

Goldstein et al., "A Multistage Representation of the Wiener Filter Based on Orthogonal Projections", IEEE Transactions on Information Theory, vol. 44, No. 7, Nov. 1998.

Myrick et al., "Multistage Anti-Spoof GPS Interference Correlator (MAGIC)", Milcom 2015 Track 1—Waveforms and Signal Processing.

Nguyen et al., "Superresolution HRR ATR with High Definition Vector Imaging", IEEE Transactions on Aerospace and Electronic Systems, vol. 37, No. 4, Oct. 2001.

Novak et al., "Automatic Target Recognition Using Enhanced Resolution SAR Data", IEEE Transactions on Aerospace and Electronic Systems, vol. 35, No. 1, Jan. 1999.

Picciolo et al., "M-Cancellers: Tunable, Robust, Rapid-Converging, Parallel/Pipeline, Linear Adaptive Processors", IEEE Xplore, 2020.

Wilbur Leon Myrick, "Low Complexity Anti-Jam Processing for GPS via Multi-Stage Nested Wiener Filter", Dec. 2020.

* cited by examiner

Start

Obtain sensor data ⟶605

Transform a data representation of sensor data to obtain a statistical feature vector representing the sensor data ⟶610

Perform object detection and/or classification ⟶615

Provide indication of the object detection and/or classification ⟶620

Done? ⟶625

No

Yes

End

600

800

900

1000

1100

1102

1104             1106             1108

SYSTEM AND METHOD FOR DETECTION AND CLASSIFICATION USING A STATISTICAL FEATURE VECTOR

CROSS REFERENCE TO OTHER APPLICATIONS

This application claims priority to U.S. Provisional Patent Application No. 63/337,926 entitled Data Compression Using a Statistical Feature Vector filed May 3, 2022, which is incorporated herein by reference for all purposes.

BACKGROUND OF THE INVENTION

Synthetic aperture radar (SAR) is a technology used in remote sensing to generate hi-resolution images of a target, such as the Earth's surface. SAR systems generally transmit microwave signals and then collect back signals that are backscattered from the target. The backscattered signals are processed to generate an image of the target.

SAR technology has a wide variety of applications, including military and civilian uses. In military applications, SAR can be used in connection with reconnaissance, surveillance, target detection, and target seeking. Because SAR is able to operate in all weather conditions, SAR provides a robust and resilient detection technology that is particularly valuable for military applications.

However, processing SAR sensor data (e.g., the backscattered signals reflected from the target) can be challenging because of the large amount of data generated and the complexity of the signals. The processing of the backscattered signals has traditionally included processing the image data in a similar manner to the processing of optical image data, which can lead to sub-optimal performance.

BRIEF DESCRIPTION OF THE DRAWINGS

Various embodiments of the invention are disclosed in the following detailed description and the accompanying drawings.

DETAILED DESCRIPTION

Figure 1:
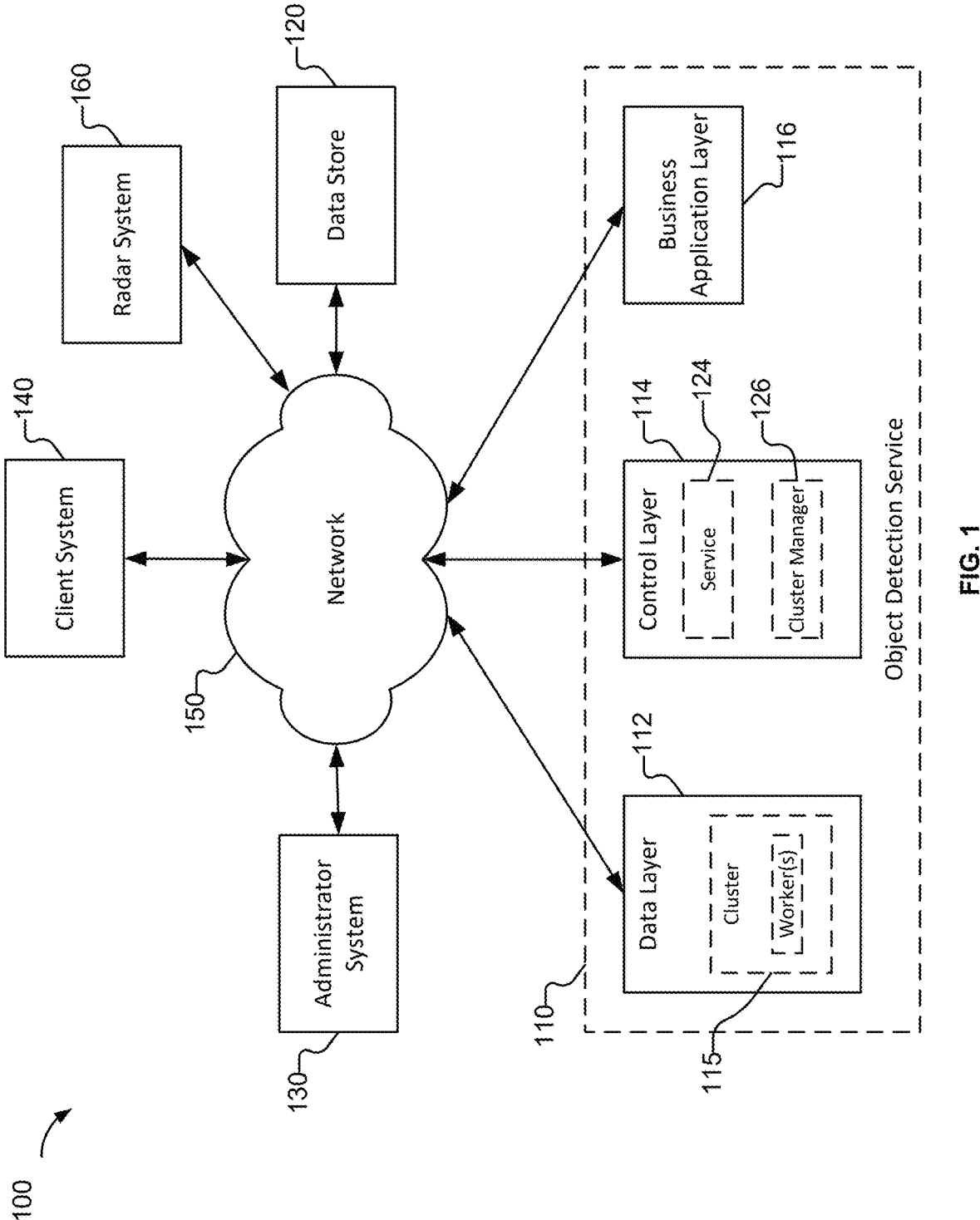
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments include a method, system, and/or device for detecting and/or classifying one or more objects in data such as raw data collected by one or more sensors. The method includes (i) obtaining sensor data, (ii) processing the sensor data to obtain hypercube data representing the sensor data, (iii) transforming a data representation of the sensor data to obtain a statistical feature vector representing the sensor data, wherein the data representation is transformed based at least in part on processing the data representation using an adaptive Multistage Wiener Filter (MWF) or another common adaptive filter like a standard adaptive Wiener Filter, (iv) performing an object detection and/or classification based at least in part on analyzing the statistical feature vector using a machine learning model, and (v) providing an indication of the object detection and/or classification.

In some embodiments, a system for determining a statistical feature vector is disclosed. The statistical feature vector may be determined based on an output from an adaptive filter that is used to process a data representation of sensor data, such as synthetic aperture radar (SAR) data. The statistical feature vector may be orders of magnitude (e.g., 1-2 orders of magnitude) smaller in size than the raw sensor data, however, the statistical feature vector may retain the most important information (e.g., the statistical feature vector provides a form of coherent data compression). As an example, the adaptive filter corresponds to an adaptive Wiener filter, such as an adaptive MWF. The adaptive MWF is used to determine the most important scattering space (e.g., potentially statistical combinations of scattering center elements) that represents the target. The adaptive MWF implements machine learning to provide filter weights representing the most important target information in the complex radar domain. As described herein, Wiener filters or MWFs pertain to their adaptive versions, not optimal versions. Optimal versions require perfect knowledge (e.g., via some unknowable clairvoyance) of the interference and noise statistics to produce the optimal filter weights. Adaptive filters instead learn statistics from sensing data first and then produce only approximations to these optimal statistics and then used to produce approximations to optimal weights.

In some embodiments, sensor data input (e.g., a data set) is received that comprises a coherent data set. The sensor data is broken into a plurality of subsets (e.g., slices of the sensor data) that represent the sensor data but include different noise profiles. In some embodiments, the subsets of sensor data are partially overlapping. In some embodiments, the subsets are equal in size. The plurality of subsets of sensor data are used as input to an adaptive filter model that determines a statistical feature vector that characterizes the sensor data. In some embodiments, the adaptive filter model is extracting the coherent signal from the sensor data and eliminating the noise while generating a compact representation of the sensor data. In some embodiments, the adaptive filter model comprises a Weiner filter. In some embodiments, the adaptive filter model comprises an adaptive multistage Weiner filter. In some embodiments, the adaptive filter model comprises a linear adaptive filter.

In some embodiments, the sensor data comprises an SAR data set. In some embodiments, the sensor data comprises multiple SAR data sets. In some embodiments, a raw data set is interpolated prior to being broken into a plurality of subsets. In some embodiments, other preprocessing is performed prior to or after the breaking of the data set into a plurality of subsets. For example, the sensor data or subsets are rotated or scaled to make appropriate subsets. The sensor data may be rotated or scaled based on an object template (or a configuration of the object template) stored in a template library. For example, the sensor data is pre-processed to standardize an alignment of objects/potential objects.

In some embodiments, the statistical feature vector is used to identify whether the sensor data represents a known target. In some embodiments, the system matches the statistical feature vector with a library of known targets (e.g., objects). In some embodiments, a probability of matching is determined using the statistical feature vector and a stored target from the library of known targets (e.g., a statistical feature vector of the known target in the library). In some embodiments, in response to the probability of matching being above a threshold, the stored target is determined to match the statistical feature vector of the data set indicating that the target is present in the data set. In various embodiments, there are multiple thresholds for the probability to indicate a low, medium, high, or any other scaled determination or probability of matching of a given library target with the input data set.

In some embodiments, the system inputs the statistical feature vector to a classifier that is configured to predict/ classify an object to which the sensor data corresponds (e.g., to perform object/target detection, etc.). For example, the system queries a model based at least in part on the statistical feature vector. The model may be a machine learning model, such as a model trained on a training set of historical statistical feature vectors corresponding to various objects/ targets.

In some embodiments, the statistical feature vector is used to reconstruct a version of the original data set. One example is a data set representation with potentially reduced noise or including only important features of the data in the data set.

The use of a statistical feature vector in connection with target detection/classification in SAR data improves on related art techniques that handled SAR data in the same manner as optical image data. Such use of a statistical feature vector results in improved detection (e.g., a more accurate target detection/classification). Furthermore, the use of a statistical feature vector may be less complex and be more efficient than the processing performed according to related art techniques for processing optimal image data. The statistical feature vector reduces the noise in the system (e.g., in the image processing) and makes the representation of the sensor data relatively compact. The statistical feature vector is thus a very efficient representation of objects in radar data (e.g., SAR data). For example, processing the statistical feature vector (e.g., performing calculations with respect to the statistical feature vector) can be performed more rapidly at least in part because the signal to noise ratio is much higher as compared to related art techniques. As another example, the compact representation provided by the statistical feature vector enables the use of a lower cost model (e.g., a smaller model).

The object detection or object classification described herein may be implemented in various uses for civilian or military applications. Examples of the applications for the object detection or object classification include detecting enemy objects; targeting objects; vision systems for seekers, observing the status of objects on Earth (e.g., the amount of oil in oil storage tanks), counting vehicles (e.g., cars) in a certain area such as a parking lot, autonomously detecting fires, etc.

FIG. 1 is a block diagram of a network system according to various embodiments of the present application. According to various embodiments, system 100 is implemented at least in part by system 200 of FIG. 2. In some embodiments, system 100 implements process 600 of FIG. 6, process 700 of FIG. 7, process 800 of FIG. 8, process 900 of FIG. 9, and/or process 1000 of FIG. 10.

In the example illustrated in FIG. 1, system 100 includes object detection service 110, data store 120, and/or administrator system 130. System 100 may additionally include client system 140 and network 150 over which one or more of object detection service 110, data store 120, administrator system 130, and client system 140 are connected. Furthermore, system 100 may additionally include radar system 160 that obtains sensor data (e.g., sensor data to be used in object/target detection or classification). In some embodiments, object detection service 110 is implemented by a plurality of servers. In various embodiments, network 150 includes one or more of a wired network, and/or a wireless network such as a cellular network, a wireless local area network (WLAN), or any other appropriate network. System 100 may include various other systems or terminals.

In some embodiments, radar system 160 obtains sensor data (e.g., SAR data) from one or more sensors (e.g., a synthetic aperture radar system(s)) or from data store 120. Radar system 160 provides the SAR data to object detection service 110 in connection with system 100 performing object detection or classification. As an example, radar system 160 provides the sensor data to object detection service 110 contemporaneous with collection of the sensor data (e.g., the sensor data is used in real-time for object detection/classification).

In some embodiments, object detection service 110 comprises data layer 112, control layer 114, and/or business application layer 116. Data layer 112, control layer 114, and/or business application layer 116 is respectively implemented by one or more servers. Control layer 114 may orchestrate the generation of the statistical feature vector and the object detection/classification, and data layer 112 may perform (e.g., based on control from control layer 114) the statistical feature vector and the object detection/classification.

In various embodiments, object detection service 110 processes sensor data (e.g., SAR data) in connection with performing object detection or classification. Object detection service 110 may implement parallel processing of the sensor data, such as by worker nodes (e.g., virtual machines) in cluster 115 of data layer 112 at scale for big data evaluations. The processing of the sensor data includes determining a statistical feature vector based at least in part on the sensor data (or a subset of the sensor data).

Object detection service 110 (e.g., data layer 112) may perform pre-processing with respect to the sensor data before processing the sensor data to determine the statistical feature vector. The pre-processing of the sensor data may include rotating and/or scaling the sensor data. In some embodiments, the pre-processing is performed with respect to one or more slices of a phase history domain representation (e.g., an output from performing an inverse Fourier transform on the common form of sensor data). In all cases where a Fourier transform or an inverse Fourier transform are described herein, these processes pertain also to more practical discrete Fourier transforms and inverse discrete Fourier transforms and their equivalent forms.

Object detection service 110 (e.g., data layer 112) rotates the sensor data to align the sensor data according to a predefined alignment. The predefined alignment corresponds to an alignment of object templates to which the statistical feature vector is compared to determine an object match. In some embodiments, the predefined alignment corresponds to an alignment of object templates or other training set data to train a model that object detection service 110 uses to perform object detection/classification (e.g., a model that object detection service 110 queries for a predicted object classification). For example, the training set is normalized to align the samples (e.g., object templates). Various rotation algorithms may be implemented, such as the tilt algorithm, the radon transform, etc. In some embodiments, object detection service 110 (e.g., data layer 112) finds linear features in the sensor data and performs an autorotation.

Additionally, or alternatively, object detection service 110 (e.g., data layer 112) scales the sensor data to scale the sensor data according to a predefined scaling. The predefined scaling corresponds to scaling of object templates to which the statistical feature vector is compared to determine an object match. Alternatively, the predefined scaling is set based on one or more dimensions of an adaptive filter used to obtain the statistical feature vector. In some embodiments, the predefined alignment corresponds to an alignment of object templates or other training set data to train a model that object detection service 110 uses to perform object detection/classification (e.g., a model that object detection service 110 queries for a predicted object classification). For example, the training set is normalized to have consistent scaling/size across the samples (e.g., the object templates).

In some embodiments object detection service 110 (e.g., data layer 112) processes the sensor data to obtain a data representation of the sensor data. The data representation may correspond to a phase history domain representation. For example, object detection service 110 obtains an output from an inverse Fourier transform being performed with respect to the sensor data. Object detection service 110 may perform the inverse Fourier transform on the sensor data or may query another service or system for a result of the inverse Fourier transform being performed on the sensor data.

Object detection service 110 (e.g., data layer 112) determines the statistical feature vector based at least in part on the output from the inverse Fourier transform performed with respect to the sensor data. In some embodiments, object detection service 110 inputs the phase history domain representation to an adaptive filter, and the output from the adaptive filter is used to generate the statistical feature vector. As an example, the adaptive filter corresponds to an adaptive Wiener filter, such as an adaptive MWF. The adaptive MWF is used to determine the most important scattering space (e.g., potentially statistical combinations of scattering center elements) that represents the target.

Processing (e.g., filtering) the phase history domain representation of the sensor data using a MWF results in a MWF subspace being defined (e.g., a Krylov basis/subspace being defined). Krylov subspaces are used in algorithms for finding approximate solutions to high-dimensional linear algebra problems. In response to determining the Krylov basis/subspace, object detection service 110 generates the statistical feature vector. For example, object detection service 110 extracts the statistical feature vector based on a subspace Krylov spectral basis.

In some embodiments, before inputting a data representation of the sensor (e.g., the phase history domain representation) into the adaptive filter (e.g., after performing an inverse Fourier transform with respect to the sensor data), object detection service 110 (e.g., data layer 112) subsamples the phase history domain representation to obtain a data representation to be input to the adaptive filter. The subsampling may be performed in parallel (e.g., by cluster 115 of data layer 112) or the sampled data (e.g., the subsets of data obtained by subsampling the phase history domain representation) may be processed by the adaptive filter in parallel. As an example of the subsampling, object detection service 110 extracts a plurality of phase history regions (e.g., matrices) from the phase history domain representation. The subsampling may include using a window (e.g., filter) having a predefined size (e.g., a size that is less than the size of the phase history domain representation). For example, object detection service 110 iteratively samples different parts of the phase history domain representation based on the window, such as by shifting the window to a different location of the phase history domain representation.

In some embodiments, object detection service 110 (e.g., data layer 112) generates a data representation of the sensor data based on the sampled data (e.g., the data obtained by sampling various portions of the phase history domain representation). For example, object detection service 110 uses the sampled data (e.g., the various subsets of data) to generate a datacube.

According to various embodiments, in response to obtaining the statistical feature vector, object detection service 110 (e.g., data layer 112) performs an object detection/classification. As an example, object detection service 110 queries a classifier based on the statistical feature vector. The classifier may be a model, such as a machine learning model. The model may be trained according to various machine learning processes. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, Convolutional Neural Networks (CNNs), etc. In some embodiments, the classifier is a Generative Adversarial Network (GAN) model.

In various embodiments, data layer 112 is configured to process workloads, such as by processing a set of tasks. The workloads may correspond to performing object detection/classification with respect to sensor data. Data layer 112 comprises a cluster 115 of compute resources that are configured to process subsets of the set of tasks in parallel. Cluster 115 may be configured and/or managed by cluster manager 126 of control layer 114. In response to receiving an allocation of a set of tasks, cluster 115 uses a set of compute resources (e.g., worker nodes, such as executors, etc.) to correspondingly process the tasks for a partition/allocation. For example, cluster manager 126 provides an indication of the allocation/partitioning and input data for the current stage in processing the workload. In response to processing the set of tasks, cluster 115 obtains result data for each task of the set of tasks (e.g., a number of tasks). The result data may be aggregated to determine a result for the particular stage. In some embodiments, after the last stage, the result data may be aggregated to determine a result for the workload.

According to various embodiments, object detection service 110 (e.g., control layer 114 and/or business application layer 116) provides a user interface via which a user discovers and/or accesses data, inputs queries, and receives resulting data (e.g., an indication that an object is detected, an indication of the object classification such as a predicted classification, etc.). As an example, the web interface is provided as a web service such as on a page accessed by a user via client system 140.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., sensor data), etc. Various other applications can be provided by business application layer 116. For example, a user or other service/system queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator uses an interface provided/configured by business application layer 116 to configure (e.g., define) one or more security policies including access permissions to information stored on a data store 120, permission to access performance profiles, etc.

Administrator system 130 is a system by which an administrator uses or manages object detection service 110. For example, administrator system 130 comprises a system for communication, data access, computation, etc. An administrator uses administrator system 130 to maintain and/or configure object detection service 110 and/or data store 120. For example, an administrator uses administrator system 130 to start and/or stop services (e.g., service 124 that implements object detection/classification) on object detection service 110 and/or data store 120, to reboot data store 120, to install software on object detection service 110 and/or data store 120, to add, modify, and/or remove data on data store 120, etc. Administrator system 130 communicates with object detection service 110 and/or data store 120 via a web-interface. For example, administrator system 130 communicates with object detection service 110 and/or data store 120 via a web-browser installed on administrator system 130. As an example, administrator system 130 communicates with object detection service 110 and/or data store 120 via an application running on administrator system 130.

In some embodiments, business application layer 116 serves as a gateway via which the administrator may interface to manage, configure, etc. data layer 112, control layer 114, and/or business application layer 116.

Data store 120 stores one or more datasets. In various embodiments, the one or more datasets comprise sensor data such as SAR data. Additionally, the one or more datasets may include datasets pertaining to active measures to be implemented in response to object detection/classification, or any other appropriate data. Data store 120 comprises a database system for storing data in a table-based data structure, an object-based data structure, etc.

According to various embodiments, a user uses system 100 (e.g., a client or terminal, such as client system 140, that connects to system 100 via network 150) to execute one or more tasks with respect to data (e.g., one or more datasets) stored on data store 120. For example, a user inputs to a client terminal a query or request to execute an object detection or classification (e.g., run a query against a dataset of sensor data at data store 120), and object detection service 110 receives the query or request to execute the object detection or classification from client system 140 via network 150, etc. In response to receiving the query or request to execute the task, object detection service 110 uses data layer 112 (e.g., cluster 115) to execute the object detection or classification (e.g., with respect to certain sensor data such as data stored at data store 120) and provides a result to the user (e.g., via the client terminal). In some embodiments, the result comprises information or a set of information that is responsive to the query or execution of the object detection/classification.

In some embodiments, data layer 112, control layer 114, and/or business application layer 116 are implemented on a single server or a plurality of servers. For example, data layer 112 and business application layer 116 are different modules running on a same server or set of servers.

In some embodiments, in response to detecting or classifying an object in sensor data, system 100 determines whether to perform an active measure based on such detection/classification. In response to determining to perform an active measure, system 100 implements the active measure or causes another system or service to implement the active measure (e.g., system 100 provides an indication that an active measure is to be performed). Examples of active measures include providing an indication that an object is detected, providing an indication of the predicted object classification, targeting the object, causing the object to be intercepted, etc. In some embodiments, system 100 determines the active measure to implement (if any) based on a mapping of objects (e.g., types of objects, object identifiers, etc.) to active measures.

Figure 2:
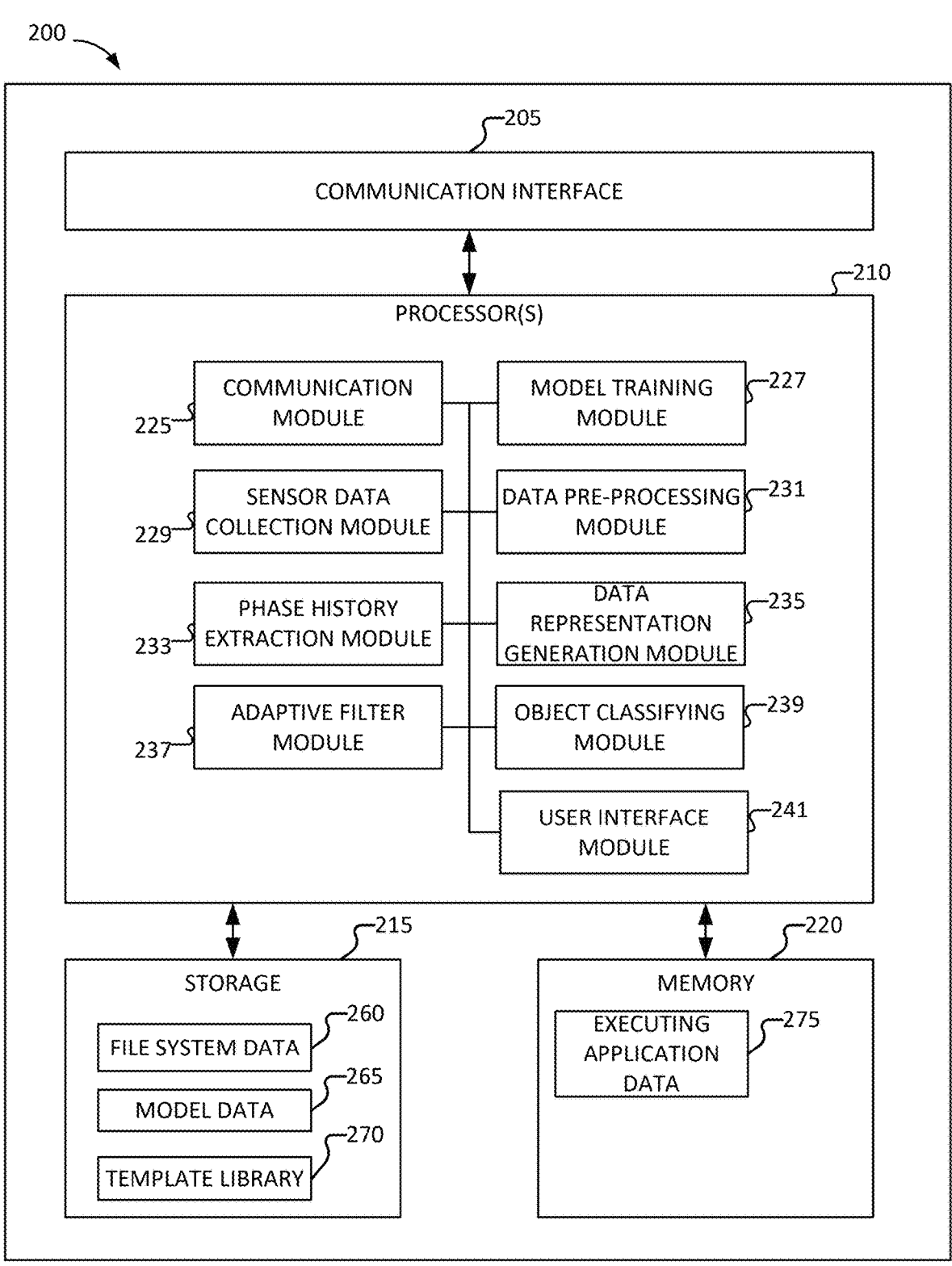
FIG. 2 is a block diagram of an object detection service system according to various embodiments of the present application.

FIG. 2 is a block diagram of an object detection service system according to various embodiments of the present application. According to various embodiments, system 200 implements at least part of system 100 of FIG. 1. In some embodiments, system 200 implements process 600 of FIG. 6, process 700 of FIG. 7, process 800 of FIG. 8, process 900 of FIG. 9, and/or process 1000 of FIG. 10.

According to various embodiments, system 200 corresponds to, or comprises, a system for processing sensor data, determining statistical feature vectors representing sensor data, and performing object detections and/or classifications. Additionally, system 200 may determine and/or implement an active measure in response to determining that an object is detected in the sensor data or otherwise based on the object classification.

In the example shown, system 200 implements one or more modules in connection with determining a statistical feature vector and/or performing object detection or classification, etc. System 200 may further implement modules for pre-processing the sensor data, determining a phase history domain representation of the sensor data (or the pre-processed data), etc. System 200 comprises communication interface 205, one or more processors 210, storage 215, and/or memory 220. One or more processors 210 comprises one or more of communication module 225, model training module 227, sensor data collection module 229, data pre-processing module 231, phase history extraction module 233, data representation generation module 235, adaptive filter module 237, object classifying module 239, and/or user interface module 241.

In some embodiments, system 200 comprises communication module 225. System 200 uses communication module 225 to communicate with various client terminals or user systems such as a user system or an administrator system, or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute tasks (e.g., requests for processing workloads, servicing queries, etc.) such as from various client terminals or user systems (e.g., from the terminals or systems via a business application layer). The one or more queries or requests to execute tasks is with respect to information stored in one or more datasets (e.g., data stored in data store 120). Communication module 225 is configured to provide to various client terminals or user systems information such as information that is responsive to one or more queries or tasks requested to be executed. In some embodiments, communication module 225 provides the information to the various client terminals or user systems in the form of one or more reports (e.g., according to a predefined format or to a requested format), and/or via one or more user interfaces (e.g., an interface that user system is caused to display).

In some embodiments, communication module 225 is configured to receive information pertaining to a workload, or data to be analyzed. Communication module 225 may also be configured to receive information pertaining to capacity/availability of compute resources. For example, a user uses a client terminal to configure a performance analysis (e.g., a set of one or more performance characteristics or profiles to be determined, etc.) on system 200 and/or configure a mechanism for determining partitioning for tasks at various stages of processing the workload (e.g., configurations for training prediction models, etc.). In some embodiments, communication module 225 is configured to communicate results of the workload processing. For example, communication module 225 sends the results to a user such as via a user interface of a client terminal.

In some embodiments, system 200 comprises model training module 227. System 200 uses model training module 227 to obtain (e.g., train) one or more models (e.g., prediction models) for predicting an object classification or for detecting an object in sensor data.

Model training module 227 trains a model using machine learning processes, such as via supervised learning. As an example, the model is trained based at least in part on one or more of a sample of sensor data comprising an object, a statistical feature vector representing a sample object (e.g., a template object), a classification of objects, etc.

Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, Convolutional Neural Networks (CNNs), etc.

In some embodiments, a model (e.g., a classifier) trained by model training module 127 is a Generative Adversarial Network (GAN) model.

In some embodiments, model training module 227 updates the model(s), such as based on performance characteristics of predicting objects or classifications for objects, or an object detection performance.

In some embodiments, system 200 comprises sensor data collection module 229. System 200 uses sensor data collection module 229 to obtain sensor data, such as from one or more sources directly, from a sensor module (not shown), or from another system or service. As an example, the sensor data comprises SAR data.

In some embodiments, system 200 comprises data pre-processing module 231. System 200 uses data pre-processing module 231 to pre-process the sensor data before further processing of the data to extract a statistical feature vector representing the sensor data. As an example, data pre-processing module 231 processes raw sensor data and the output is then used in connection with determining a statistical feature vector. Pre-processing of sensor data includes rotating the sensor data and/or scaling the sensor data. Rotating the sensor data may be based on a predefined alignment, such as a standardized alignment for object templates stored in the template library (e.g., object templates used to predict object classification). Scaling the sensor data may be based on a predefined scaling or size, such as a standardized scaling/size of object templates stored in the template library (e.g., object templates used to predict object classification). Data pre-processing module 231 can implement various rotation or scaling algorithms.

In some embodiments, system 200 comprises phase history extraction module 233. System 200 uses phase history extraction module 233 to extract a phase history domain representation of the sensor data (e.g., the pre-processed sensor data). Phase history extraction module 233 can use one or more predefined algorithms/methods for extracting the phase history domain information from the sensor data. An example of an algorithm/method used in the process to extract the phase history domain information is an inverse Fourier transform followed by selective segmentation of the resulting phase history data.

In some embodiments, system 200 comprises data representation generation module 235. System 200 uses data representation generation module 235 to generate a data representation of the phase history domain information obtained from phase history extraction module 233. The data representation may be a data cube or other data structure. In some embodiments, the data representation is generated based at least in part on data representation generation module 235 sampling the phase history domain information obtained by phase history extraction module 233. Data representation generation module 235 can sample various subsets of the phase history domain information and generate the data representation to be used in connection with determining a statistical feature vector.

In some embodiments, sampling the phase history domain information includes iteratively sampling various subsets (e.g., slices) of the phase history domain information (e.g., to extract phase history regions). As an example, data representation generation module 235 uses a window (e.g., a matrix having a predefined size) to sample a subset of the data comprised in the phase history domain information. Data representation generation module 235 iteratively samples the various subsets based on different locations of the window relative to the phase history domain information. For example, the window is slid to a new position to sample a different portion of the phase history domain information.

In some embodiments, system 200 comprises adaptive filter module 237. System 200 uses adaptive filter module 237 to use a predefined algorithm/method (e.g., a statistical feature vector algorithm) to process the data representation obtained by data representation generation module 235. For example, adaptive filter model 237 filters the data representation to obtain information from which the statistical feature vector is determined, and to determine such statistical feature vector. Various adaptive filters may be implemented. An example of an adaptive filter used in connection with determining the feature vector includes an adaptive Wiener filter, such as an adaptive MWF. The adaptive MWF is used to determine the most important scattering space (e.g., potentially statistical combinations of scattering center elements) that represents the target. The adaptive MWF converges to the optimal MWF as the number of data samples for learning statistics increases, where the MWF optimizes against the minimum mean square error (MMSE) metric. The adaptive MWF implements statistical compression for machine learning to provide filter weights representing the most important target information in the complex radar domain.

Figure 4:
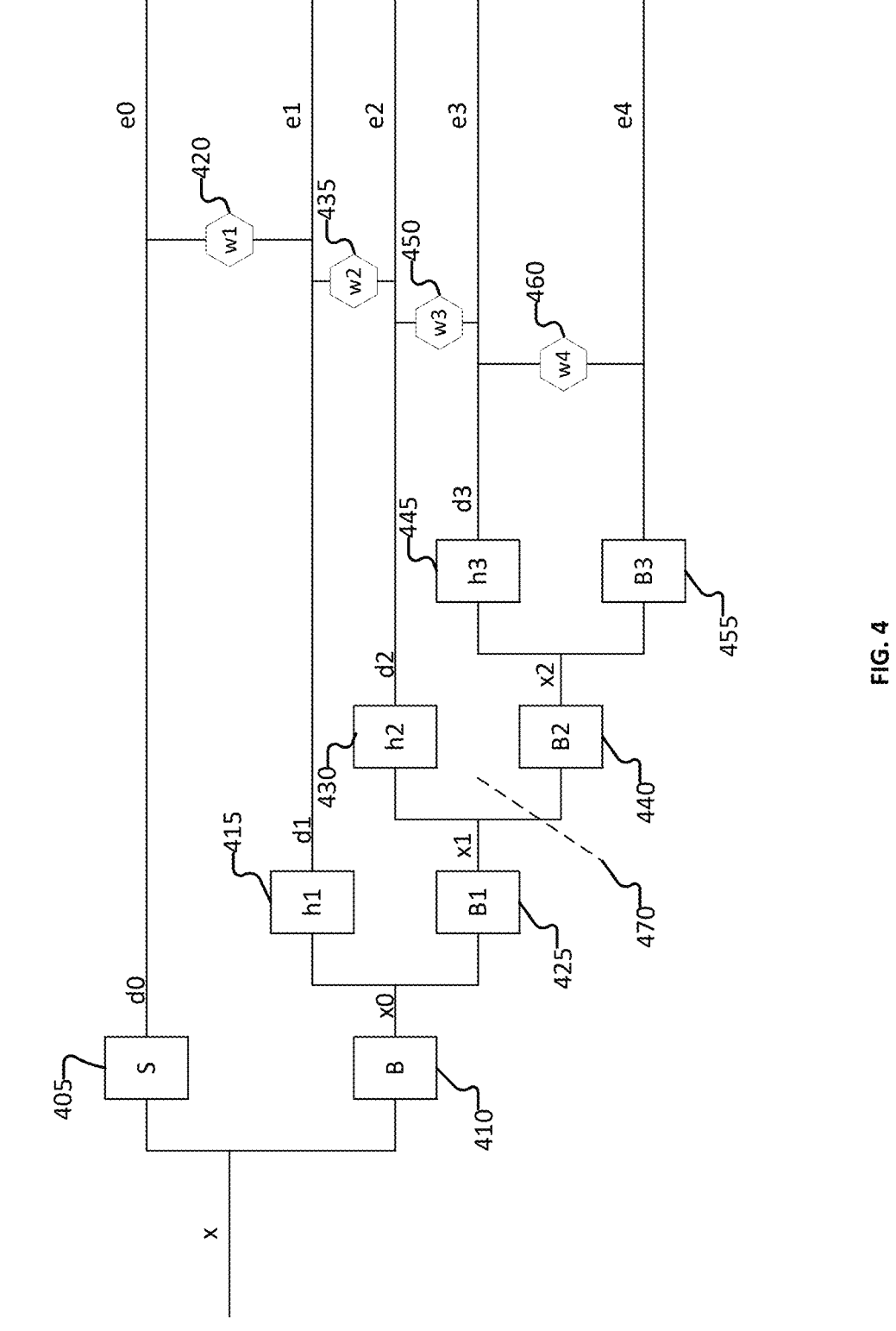
FIG. 4 is a diagram illustrating a method for processing a data representation using an adaptive filter to obtain a statistical feature vector according to various embodiments of the present application.

In some embodiments, adaptive filter module 237 implements process 400 of FIG. 4.

In response to processing the data representation using an adaptive filter, adaptive filter module 237 generates a statistical feature vector. The statistical feature vector may be orders of magnitude (e.g., 1-2 orders of magnitude) smaller in size than the raw sensor data, however, the statistical feature vector may retain the most important information (e.g., the statistical feature vector provides a form of coherent data compression).

In some embodiments, system 200 comprises object classifying module 239. System 200 uses data object classifying module 239 to perform object detection or classification. For example, data object classifying module 239 performs object classification based at least in part on sensor data or a data representation of the sensor data.

In some embodiments, object classifying module 239 uses the statistical feature vector obtained by adaptive filter module 237 in connection with performing the object detection or object classification. In some embodiments, the statistical feature vector is used to identify whether the sensor data represents a known target. The system matches the statistical feature vector with a library of known targets (e.g., objects). A probability of matching is determined using the statistical feature vector and a stored target from the library of known targets (e.g., a statistical feature vector of known targets stored as a representative library of known targets). In some embodiments, in response to the probability of matching being above a predefined match threshold, the stored target is determined to match the statistical feature vector of the sensor data indicating that the target is present in the data set. In various embodiments, object classifying module 239 implements a plurality of predefined matching algorithms and corresponding matching thresholds for the probability to indicate a low, medium, high, or any other scaled determination or probability of matching of a given library target with the sensor data.

In some embodiments, object classifying module 239 provides the statistical feature vector to a classifier that is configured to predict/classify an object to which the sensor data corresponds (e.g., to perform object/target detection, etc.). For example, the system queries a model based at least in part on the statistical feature vector. The model may be a machine learning model, such as a model trained on a training set of historical statistical feature vectors corresponding to various objects/targets.

In response to detecting an object in the sensor data or classifying an object, object classifying module 239 may provide an indication of the object classification or an indication that an object is detected in the sensor data. The indication(s) may be provided to user interface module 241 or another system/service that invoked system 200 to perform object detection/classification or that implements active measures in connection with object detection/classification.

In some embodiments, system 200 comprises user interface module 241. System 200 uses user interface module 241 in connection with configuring information (or the display thereof) to be provided to the user such as via administrator system 130 and/or client system 140 of system 100. In some embodiments, user interface module 241 configures a user interface to be displayed at a client terminal used by the user or administrator, such as an interface that is provided in a web browser at the client terminal. In some embodiments, user interface module 241 configures the information to be provided to the user such as configuring one or more reports of information that is responsive to a query or task executed with respect to data store 120 (e.g., an object detection or classification against one or more datasets). In some embodiments, user interface module 241 configures a user interface with which a user or other system inputs a query or configures a model (or a training of the model) for detecting or classifying objects.

According to various embodiments, storage 215 comprises one or more of file system data 260, model data 265, and/or template library 270. Storage 215 comprises a shared storage (e.g., a network storage system) and/or database data, and/or user activity data. In some embodiments, file system data 260 comprises a database such as one or more datasets (e.g., one or more datasets of SAR data, etc.). File system data 260 comprises data such as a dataset for training a machine learning process, historical information pertaining to object classification or detection, etc. In some embodiments, model data 265 comprises information pertaining to models for predicting an object classification in sensor data or for detecting objects in sensor data. In some embodiments, template library 270 comprises information pertaining to sensor data that is collected by one or more sensors. Template library 270 may comprise SAR or other radar data. Additionally, storage 215 may store object templates in a template library (e.g., object templates used to predict object classification).

According to various embodiments, memory 220 comprises executing application data 275. In embodiments, the application data comprises data for one or more applications that perform one or more of receive and/or execute a query or request for object detection/classification, generate a report and/or configure information that is responsive to an object detection or classification, and/or to provide to a user information that is responsive to a query or request for object detection/classification. Various other applications may be comprised in and executed by system 200.

Figure 3:
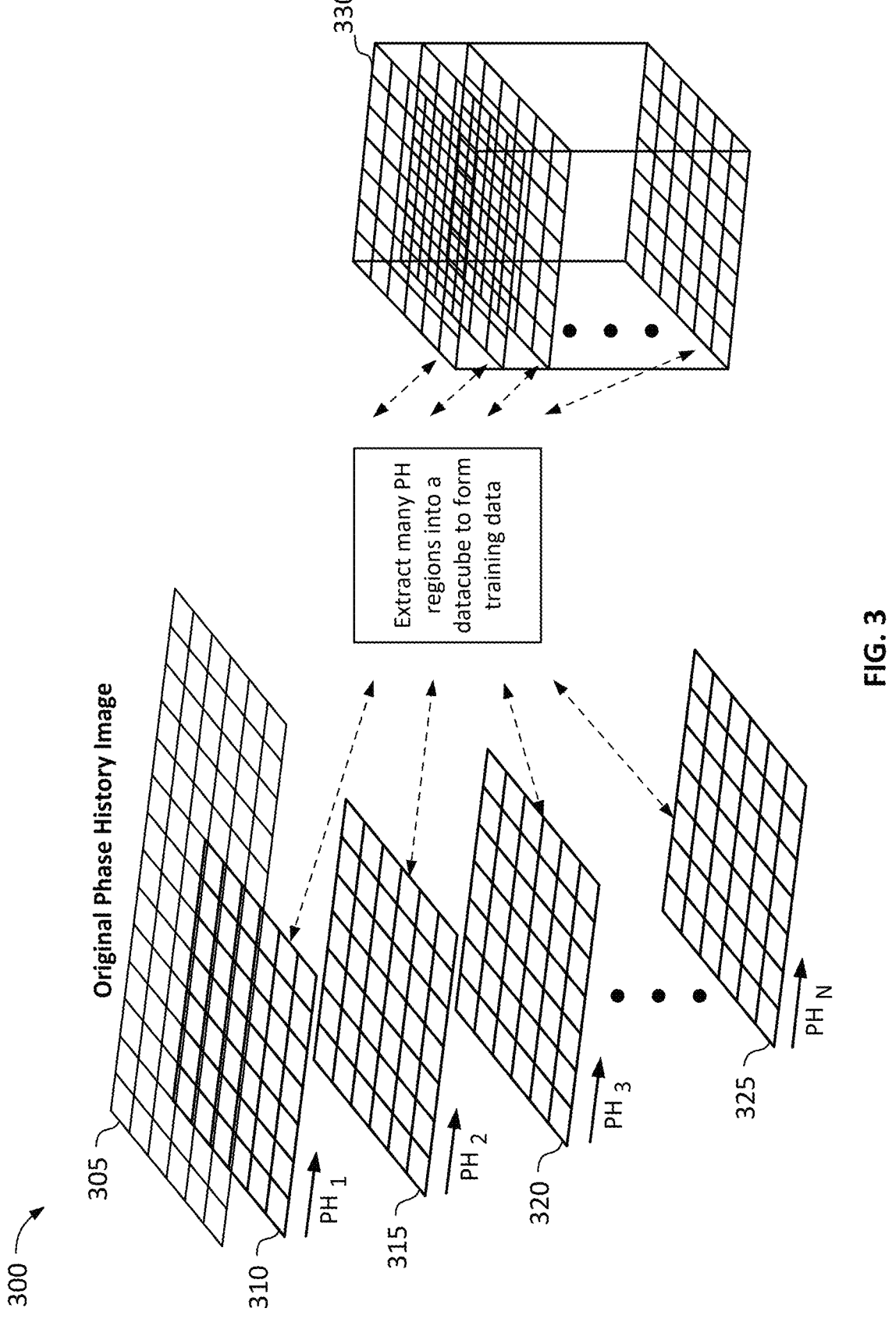
FIG. 3 is a diagram of a process illustrating a sampling of a data representation of sensor data according to various embodiments.

FIG. 3 is a diagram of a process illustrating a sampling of a data representation of sensor data according to various embodiments. In some embodiments, process 300 is implemented by system 200 of FIG. 2. Process 300 may be implemented by phase history extraction module 233.

In the example shown, original phase history image 305 is obtained. In some embodiments, original phase history image 305 comprises the inverse Fourier transform of the original complex image, which corresponds to this original phase history domain representation of sensor data (e.g., an image captured by one or more sensors). Both forms are in general complex valued. For example, original phase history image 305 comprises an output from an inverse Fourier transform being performed with respect to sensor data (or pre-processed sensor data, such as aligned/scaled sensor data).

The system samples original phase history image 305 to obtain phase history regions 310, 315, 320, and 325. In the example shown, phase history revisions 310-325 are the same size and correspond to different subsets of original phase history image 305 (e.g., the phase history revisions may be slices of the original complex image). The system may iteratively sample original phase history image 305 by generating a window (e.g., a filter or other predefined matrix) according to a predefined size, and iteratively apply the window to different portions of original phase history image 305. For example, with each sampling, the system phase shifts the window (e.g., the filter) and obtains the corresponding subset. The sampled sensor data (e.g., the various subsets/slices of data obtained from original phase history image 305) may partially overlap or may correspond to different/distinct portions of original phase history image 305.

In response to obtaining phase history regions 310, 315, 320, and 325, the system generates data representation 330, such as a datacube comprising phase history regions 310, 315, 320, and 325. For example, each plane of the datacube may correspond to a particular phase history region.

FIG. 4 is a diagram illustrating a method for processing a data representation using an adaptive filter to obtain a statistical feature vector according to various embodiments of the present application. In some embodiments, process 400 is implemented by system 200 of FIG. 2. Process 400 may be implemented by adaptive filter module 237. In the example shown, the adaptive filter comprises an MWF. In some embodiments, the system uses an adaptive filter that is not an MWF.

In some embodiments, a data representation of the sensor data is input to the adaptive filter. In the example shown, X corresponds to the data representation. The data representation may be a phase history domain representation, or a data representation generated based on phase history domain information for the sensor data. As an example, the data representation comprises data representation 330 of FIG. 3.

In some embodiments, the adaptive filter is an MWF such as the MWF described in Goldstein, J, et al., "A Multistage Representation of the Wiener Filter Based on Orthogonal Projections," IEEE Transactions on Information Theory, vol. 44, no. 7, November 1998, pp. 2943-2959, the entirety of which is hereby incorporated herein for all purposes.

According to various embodiments, adaptive weights (e.g., MWF weights w1 420, w2 435, w3 450, and w4 460) and decomposition filters (e.g., h1 415, B1 425, h2 430, B2 440, h3 445, and B3 455) converge to statistics of the data representation X (e.g., the datacube that is input to the adaptive filter). MWF weights w1 420, w2 435, w3 450, and w4 460 and decomposition filters h1 415, B1 425, h2 430, B2 440, h3 445, and B3 455 are used to generate the statistical feature vector (e.g., the statistical feature vector that is to be input to the classifier for object detection/classification).

The adaptive filter (e.g., the MWF) is obtained by multistage decomposition. The multistage decomposition forms subspaces at each stage: one in the direction of the cross-correlation vector at the previous stage, and one in the subspace orthogonal to this vector. Then the data orthogonal to the cross-correlation vector (e.g., the output of $B_i$ in Equation (2)) is decomposed again in the same manner, stage by stage. In the example shown, the adaptive filter has 5 stages (e.g., N=5). However, in some embodiments, the adaptive filter may be truncated such as at truncation 470 illustrated in FIG. 4. In some embodiments, the system truncates the output from the adaptive filter as the covariance matrix of the filtered data after this stopping point is approximately characterized by white noise, meaning there is essentially nothing left for the filter to learn from the remaining data decomposition. For example, the system determines the stage at which the covariance matrix is approximately characterized by white noise and truncates the remaining stages. The iterative decomposition reduces the dimension of the data vector at each stage. The filtering based on the adaptive filter may be truncated to cause a relevant metric of the expected data to match an effective filter order of the adaptive filter.

According to various embodiments, $h_i$ is a normalized cross-correlation vector, which is a unit vector in the direction of $r_{x_i d_i}$, as shown in Equation (1). Conversely, $B_i$ is an (N−1)×N operator which spans the nullspace of $r_{x_i d_i}$, as expressed in Equation (2). For example, $B_i$ eliminates those signal components in the direction of vector $r_{x_i d_i}$ such that $B_i h_i$=0. The adaptive filter obtains a new data transformed data vector $z_1(k)$ (e.g., as defined by Equation (4)), by performing a transform using a unitary matrix, such as $T_1$ defined by Equation (3).

$$h_{i+1} = \frac{r_{x_i d_i}}{\left\| r_{x_i d_i} \right\|} \tag{1}$$

$$B_i = \text{null}(h_i) \tag{2}$$

US 12,561,945 B1

15

-continued $$T_1 = \begin{bmatrix} h_1^H x_0(k) \\ B_1 x_0(k) \end{bmatrix} \quad (3)$$

$$z_1(k) = T_1 x_0(k) = \begin{bmatrix} h_1^H x_0(k) \\ B_1 x_0(k) \end{bmatrix} = \begin{bmatrix} d_1(k) \\ x_1(k) \end{bmatrix} \quad (4)$$

In the example shown, data representation is input to a first stage at which the data representation is decomposed by vector S 405 and vector B 410, wherein B is the nullspace of S. For example, at the first stage, the input is filtered along the dimension defined by vector S 405. The output d0 from the filtering using vector S 405 (e.g., a projection of the data representation with respect to vector S 405) has the same number of dimensions as the input to the filter, and the output x0 from the nullspace defined by S (e.g., output from filtering using vector B 410) is then input into another stage using another steering vector and a corresponding vector defining the nullspace (e.g., steering vector h1 415 and corresponding nullspace defined by vector B1 425). The steering vector for the next stage may be defined by Equation (1). The output d2 from the filtering using vector S 405 has the same number of dimensions as the input to the filter (e.g., x0), and the output x1 from the nullspace defined by S (e.g., output from filtering using vector B 410) is then input into another stage using another steering vector and a corresponding vector defining the nullspace (e.g., steering vector h2 430 and corresponding nullspace defined by vector B2 440). The output d2 from the filtering using vector S 405 has the same number of dimensions as the input to the filter (e.g., x1), and the output x2 from the nullspace defined by S (e.g., output from filtering using vector B 410) is then input into another stage using another steering vector and a corresponding vector defining the nullspace (e.g., steering vector h3 445 and corresponding nullspace defined by vector B3 455). The output d2 from the filtering using vector S 405 has the same number of dimensions as the input to the filter (e.g., x2).

The space defined by the output of the adaptive filter is characterized by having channels that are only correlated with their neighbors and not with other non-neighboring elements. The system obtains MWF weights w1 420, w2 435, w3 450, and w4 460, which can be used to decorrelate elements. As an example, the pivoting of data off a desired steering vector (S 405) and the iterative pivoting off other steering vectors (h1 415, h2 430, and h3 445) results in less leakage of data from data representation x. The steering vectors may be selected according to MWF filter theory. An illustrative example of an extent to which the adaptive filter may be truncated is if the dimensionality of the input to the adaptive filter has dimensionality in the hundreds or thousands, the adaptive filter may be truncated at a stage corresponding to resultant data that is orders of magnitude less than such dimensionality (e.g., the adaptive filter may be truncated at approximately stage 5 to stage 10). As another illustrative example, if the sensor data has dimensionality of 150 pixels×150 pixels, the steering vector is significantly reduced and has a number of pixels on the order of magnitude of 12 pixels. The use of projecting data according to a steering vector and a corresponding vector defining the nullspace identifies when the data input has a very strong representation with respect to one vector, because the nullspace becomes null.

In some embodiments, the statistical feature vector a is then derived as:

$$a = \delta_1 - Ba_x \quad (5)$$

16 where $\delta_1$ is a N×1 vector, $\delta_1 = [1, 0, \ldots, 0]^T$, B is vector B 410 of FIG. 4. $a_x$ is:

$$a_x = \sum_{i=1}^{ith\,stage} (-1)^{(i+1)} \prod_{j=1}^{i-1} B_j h_i \prod_{l=1}^{i} w_l \quad (6)$$

where ith stage<N−1, and $w_1$ are the adaptive MWF weights (e.g., adaptive MWF weights w1 420, w2 435, w3 450, and w4 460).

Note that a standard adaptive Wiener filter produces a length-N weight vector that attempts to minimize the mean square error metric between a corrupted signal and a desired signal. The statistical feature vector is equal to this adaptive Wiener filter. The adaptive MWF (operated at full rank—no truncation) is numerically equal to a standard adaptive Wiener filter—they both produce the same filter vector. But the MWF form can be truncated for additional benefit, and the result is a reduced rank adaptive Wiener filter vector (of same length, N) but less representative of the input data that forms it. This is beneficial in that in practice much of the input data has little to do with primary trends within the original data-it often has pure noise components irrelevant to the practitioner. The reduced rank Wiener filter does not represent the noise, just the few revelvent trends that are in the data. The length-N statistical feature vector for a reduced rank MWF filter is close to a length-N Wiener filter but without undesirable noise components. Both represent an equal compression size of the input data (i.e., both are length N), but the reduced rank MWF form may have more desirable characteristics (e.g., less noisy) than the full rank Wiener form. Both are length N, which may be 1-2 orders of magnitude less in size than the dimension of the original input data a characteristic compression that is useful in terms of subsequent detection and/or classification processing exploitation.

In some embodiments, the statistical feature vector comprises any equivalent linear weighting of the input data to produce the output data with low mean square error metric.

Figure 5:
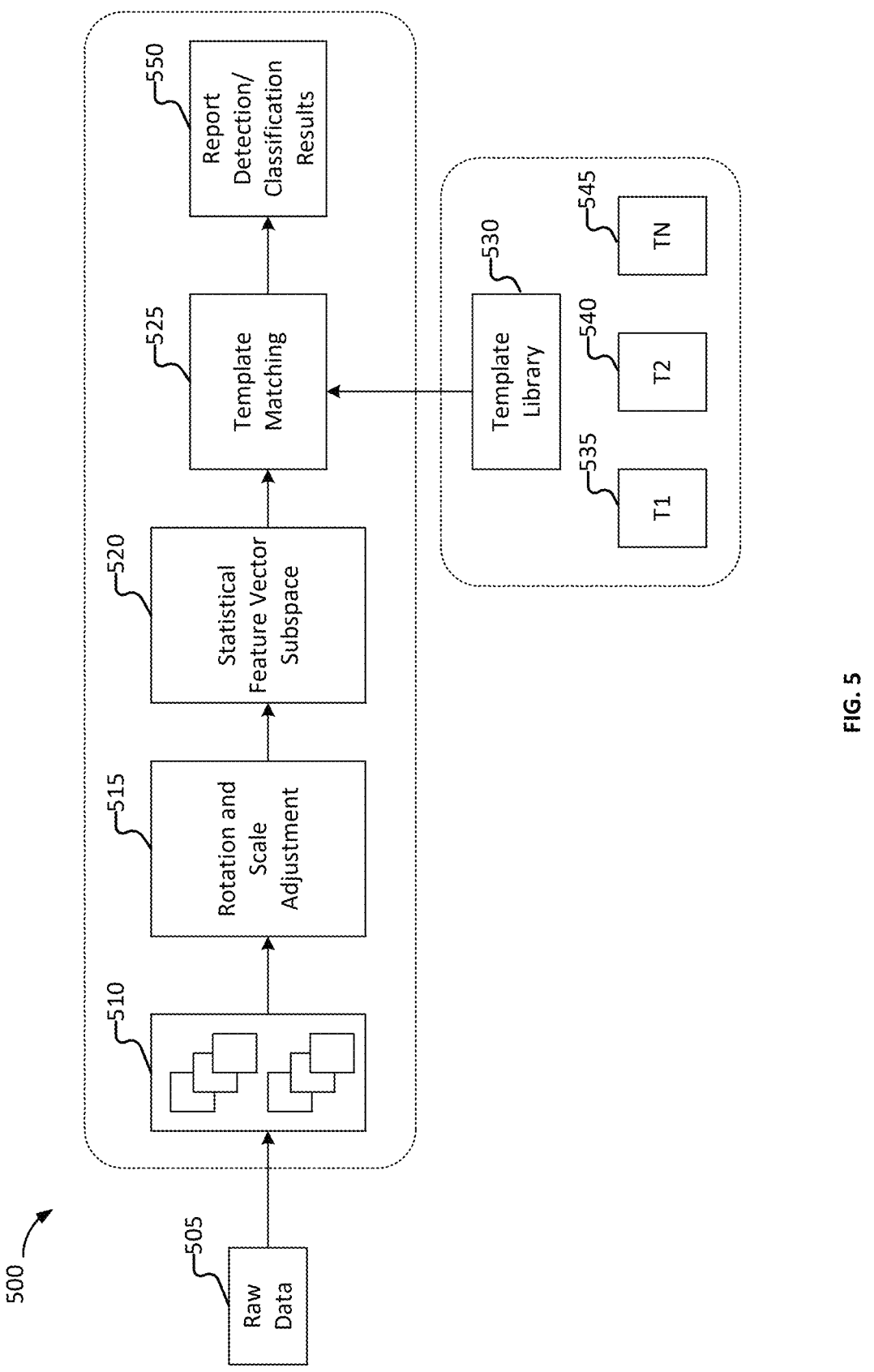
FIG. 5 is a block diagram of a method for performing object classification according to various embodiments of the present application.

FIG. 5 is a block diagram of a method for performing object classification according to various embodiments of the present application. In some embodiments, process 500 is implemented by system 100 of FIG. 1 and/or system 200 of FIG. 2.

In the example shown, raw data is input to the system at 505. The raw data may be sensor data, such as SAR data, that is collected by one or more sensors. At 510, the raw data may be sliced into a set of chunks (e.g., subsets of sensor data). The chunks may then be parallel processed through 515 and 520. For example, the system performs parallel processing with respect to at least a subset corresponding to a plurality of the resulting chunks.

At 515, the system performs alignment and scaling of the input raw data (e.g., the respective chunk of data). The alignment and scaling may include processing the raw data to be rotated according to a predefined alignment/rotation algorithm or process and to be scaled according to a predefined scaling algorithm or process. The alignment and scaling may be standardized according to the properties of object templates in template library 530 (e.g., the object templates used to train the classifier or to otherwise match against the data representation of the raw data).

At 520, the system determines the statistical feature vector subspace. For example, the system processes the raw data (or pre-processed raw data such as resulting from alignment and/or scaling) using an adaptive filter to determine the statistical feature vector. The determination of the statistical feature vector subspace may include implementing process 300 of FIG. 3 and process 400 of FIG. 4.

In response to determining the feature vector at 520, at 525, the system analyzes the statistical feature vector, where in some embodiments analysis procedure first forms the Fourier transform of the statistical feature vector as a preprocessing step, in order to then perform object detection and/or object classification with respect to the sensor data. The analysis at 525 may include a matching between the sensor data and an object template obtained from template library 530, such as object templates $T_1$ 535, $T_2$ 540, . . . and/or $T_N$ 545.

In some embodiments, the system iteratively compares the statistical feature vector to different object templates (e.g., statistical feature vectors representing sample objects) to determine an object most closely matched. For example, if the extent of the match exceeds a match threshold, the system deems the statistical feature vector to match the corresponding object template.

In some embodiments, the system queries a classifier to perform object detection or object classification. The classifier is a machine learning model that is trained against object templates in object template library 530. For example, the machine learning model is a model trained using a GAN process with respect to object templates $T_1$ 535, $T_2$ 540, . . . and/or $T_N$ 545.

At 550, the system provides a result of the object detection and/or object classification. For example, in response to detecting an object in the sensor data (e.g., raw data 505), the system provides an indication of the detection of the object and/or an identifier/type associated with the detected object. As another example, in response to determining that the system (e.g., the model) successfully classifies an object represented by the sensor data, the system provides an indication of such classification. The result obtained from the object detection or object classification may be provided to another system or service that determines whether to perform active measures, determines the particular active measure to be implemented, and causes the active measure to be implemented. Active measures may include for example i) automatically identifying and classifying military targets in the presence of civilian objects (e.g., identifying tanks vs cars) in order to defend against these military targets, ii) automatically classifying building types and infrastructures for intelligence purposes (e.g., power stations, oil refineries, power lines, etc.), iii) automatically detecting and classifying vibrating objects (they leave identifiable smears in radar images)—for example, identifying active runways with aircraft powered on, etc. for purposes of intelligence purposes; iv) communicating with identified objects; and v) civil uses such as monitoring worldwide oil reserves for economic forecasting based on changes in oil container configurations, etc.

Figure 6:
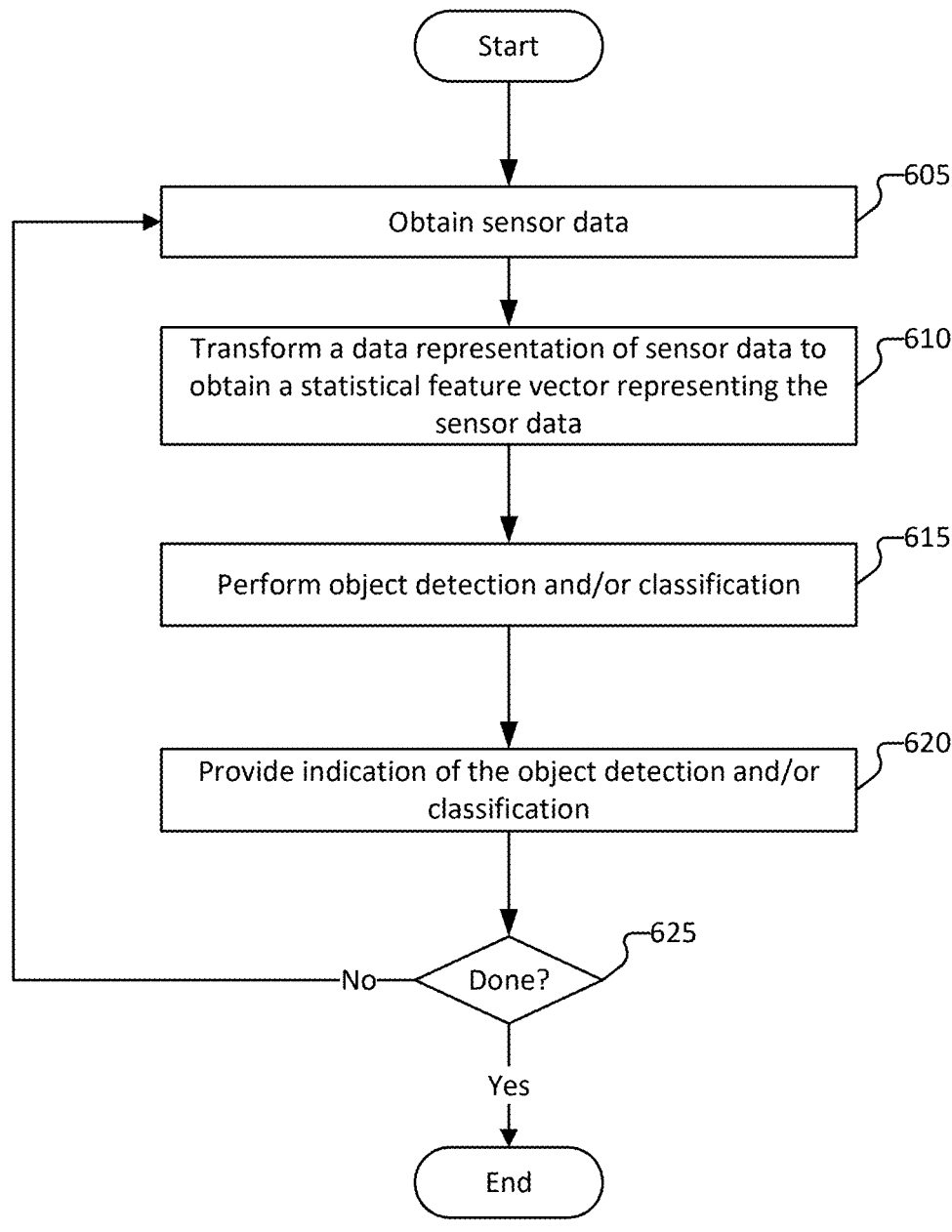
FIG. 6 is a flow diagram of a method for performing object classification according to various embodiments of the present application.

FIG. 6 is a flow diagram of a method for performing object classification according to various embodiments of the present application. In some embodiments, process 600 is implemented by system 100 of FIG. 1 and/or system 200 of FIG. 2.

At 605, sensor data is obtained. In some embodiments, the sensor data may be obtained in real-time, or contemporaneous, with collection by one or more sensors. In some embodiments, the sensor data is retrieved from a dataset storing samples to be analyzed.

At 610, a data representation of the sensor data is transformed to obtain a statistical feature vector representing the sensor data. In some embodiments, the statistical feature vector is obtained by implementing process 300 of FIG. 3 and process 400 of FIG. 4. For example, the sensor data is transformed into a phase history domain representation, and the phase history domain representation is processed using an adaptive filter (e.g., an MWF) to obtain the statistical feature vector.

At 615, an object detection and/or classification is performed. In some embodiments, the system performs the object detection and/or classification based at least in part on the statistical feature vector. The system performs the object detection and/or classification by using a statistical feature vector in connection with querying a classifier for a predicted object detection and/or classification.

At 620, an indication of the object detection and/or classification is provided. The system may provide the indication of the object detection and/or classification to the system or service that invoked process 600, or to another system or service that is to determine whether to implement an active measure in response to the object detection and/or classification.

At 625, a determination is made as to whether process 600 is complete. In some embodiments, process 600 is determined to be complete in response to a determination that no further statistical feature vectors are to be determined, no further statistical feature vectors are to be analyzed, a user has exited the system, an administrator indicates that process 600 is to be paused or stopped, etc. In response to a determination that process 600 is complete, process 600 ends. In response to a determination that process 600 is not complete, process 600 returns to 605.

Figure 7:
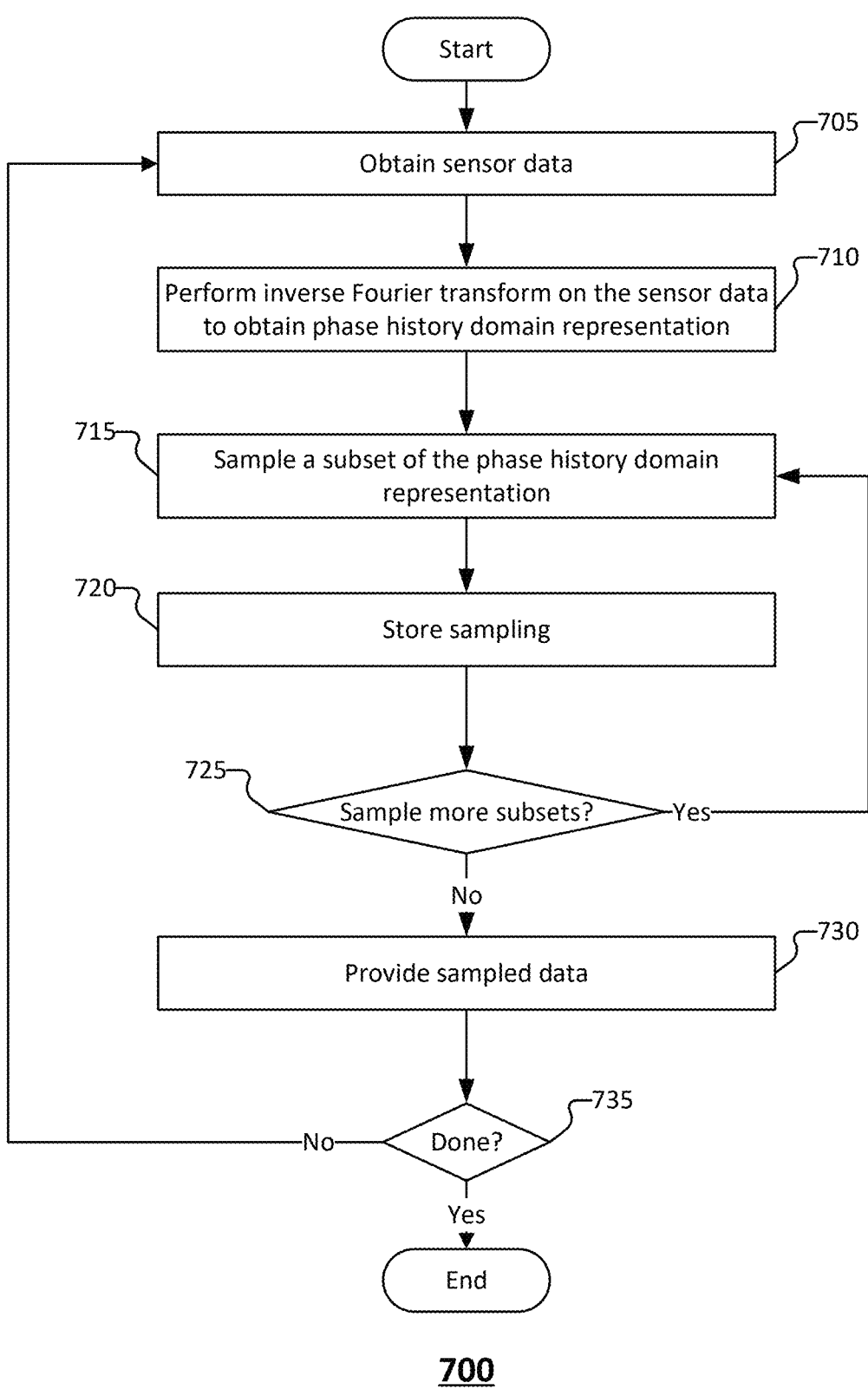
FIG. 7 is a flow diagram of a method for sampling a phase history domain representation of sensor data according to various embodiments of the present application.

FIG. 7 is a flow diagram of a method for sampling a phase history domain representation of sensor data according to various embodiments of the present application. Note that SAR images are naturally in the Fourier domain, which allows humans to see focused objects. Phase history domain data is the inverse Fourier transform of the common form of SAR images and common forms of sensor data. Phase history data is used as an input to the adaptive MWF to form a statistical feature vector. In some embodiments, process 700 is implemented by system 100 of FIG. 1 and/or system 200 of FIG. 2. In some embodiments, process 700 is invoked by 610 of process 600 of FIG. 6.

At 705, sensor data is obtained. In some embodiments, the sensor data is obtained based on the sensor data received at 605 of process 600. At 710, an inverse Fourier transform is performed with respect to the sensor data to obtain a phase history domain representation. At 715, a subset of the phase history domain representation is sampled. At 720, the sampling is stored. In some embodiments, the system stores the sampling in a dataset for sampled data. At 725, the system determines whether to sample another subset of the phase history domain representation. In response to determining that another subset is to be sampled at 725, process 700 returns to 715 and process 700 iterates over 715-725 until no further subsets of the phase history domain representation are to be sampled. In response to determining that no further subsets are to be sampled, process 900 proceeds to 730. At 730, the sampled data is provided. In some embodiments, the system provides the sampled data to a system or service that invoked process 700, such as 610 of process 600. The sampled data may be provided in a data representation, such as a datacube. At 735, a determination is made as to whether process 700 is complete. In some embodiments, process 700 is determined to be complete in response to a determination that no further phase history domain representations are to be sampled, no further sensor data is to be analyzed, a user has exited the system, an administrator indicates that process 700 is to be paused or stopped, etc. In response to a determination that process 700 is complete, process 700 ends. In response to a determination that process 700 is not complete, process 700 returns to 705.

Figure 8:
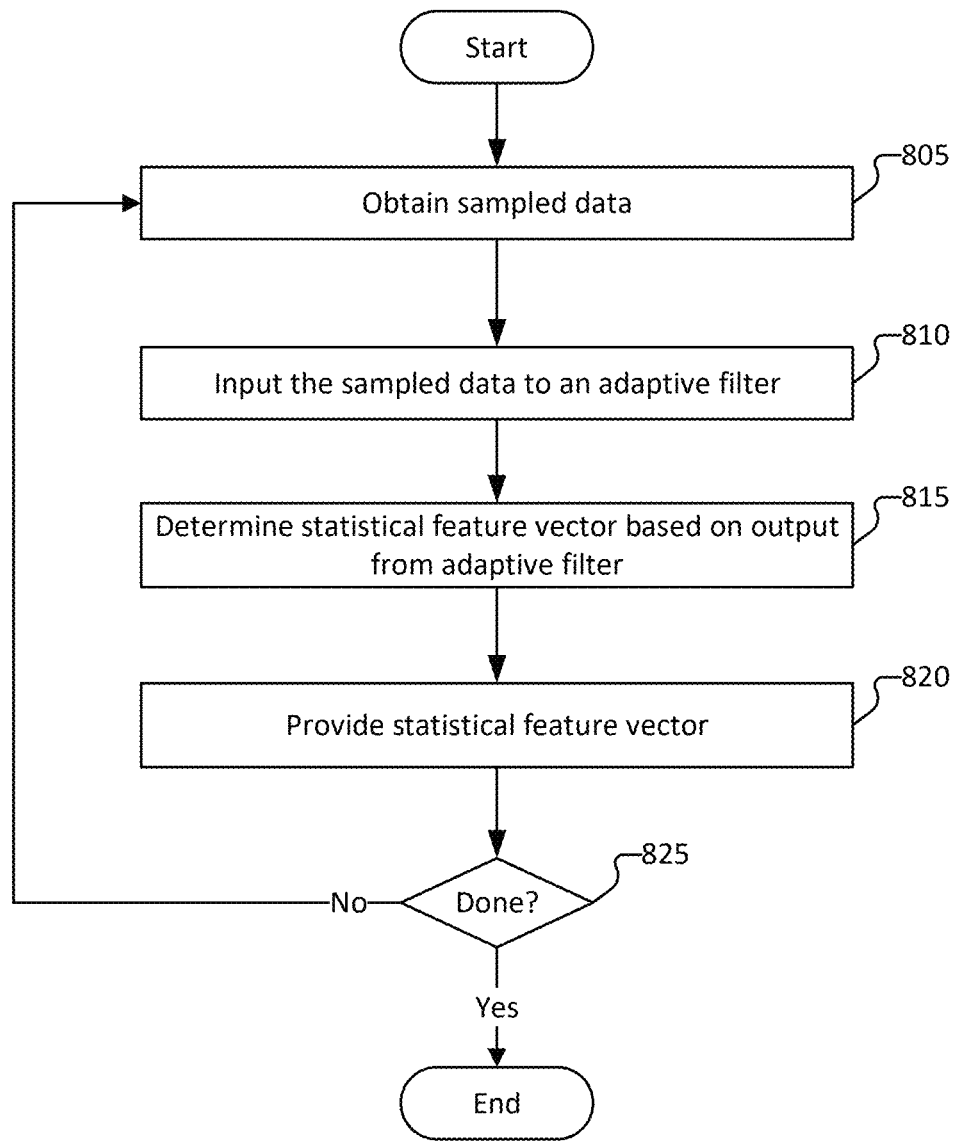
FIG. 8 is a flow diagram of a method for obtaining a statistical feature vector according to various embodiments of the present application.

FIG. 8 is a flow diagram of a method for obtaining a statistical feature vector according to various embodiments of the present application. In some embodiments, process 800 is implemented by system 100 of FIG. 1 and/or system 200 of FIG. 2. In some embodiments, process 800 is invoked by 610 of process 600 of FIG. 6. Process 800 may be invoked after process 700 is implemented.

At 805, sampled data is obtained. In some embodiments, the sampled data is obtained from 730 at process 700 of FIG. 7. At 810, the sampled data is input to an adaptive filter. As an example, the adaptive filter is an MWF, such as the filter used by process 400 of FIG. 4. At 815, a statistical feature vector is determined based on an output from the adaptive filter. At 820, the statistical feature vector is provided. In some embodiments, the system provides the statistical feature vector to a system or service that invoked process 800. At 825, a determination is made as to whether process 800 is complete. In some embodiments, process 800 is determined to be complete in response to a determination that no further statistical feature vectors are to be determined, no further statistical feature vectors are to be analyzed, a user has exited the system, an administrator indicates that process 800 is to be paused or stopped, etc. In response to a determination that process 800 is complete, process 800 ends. In response to a determination that process 800 is not complete, process 800 returns to 805.

Figure 9:
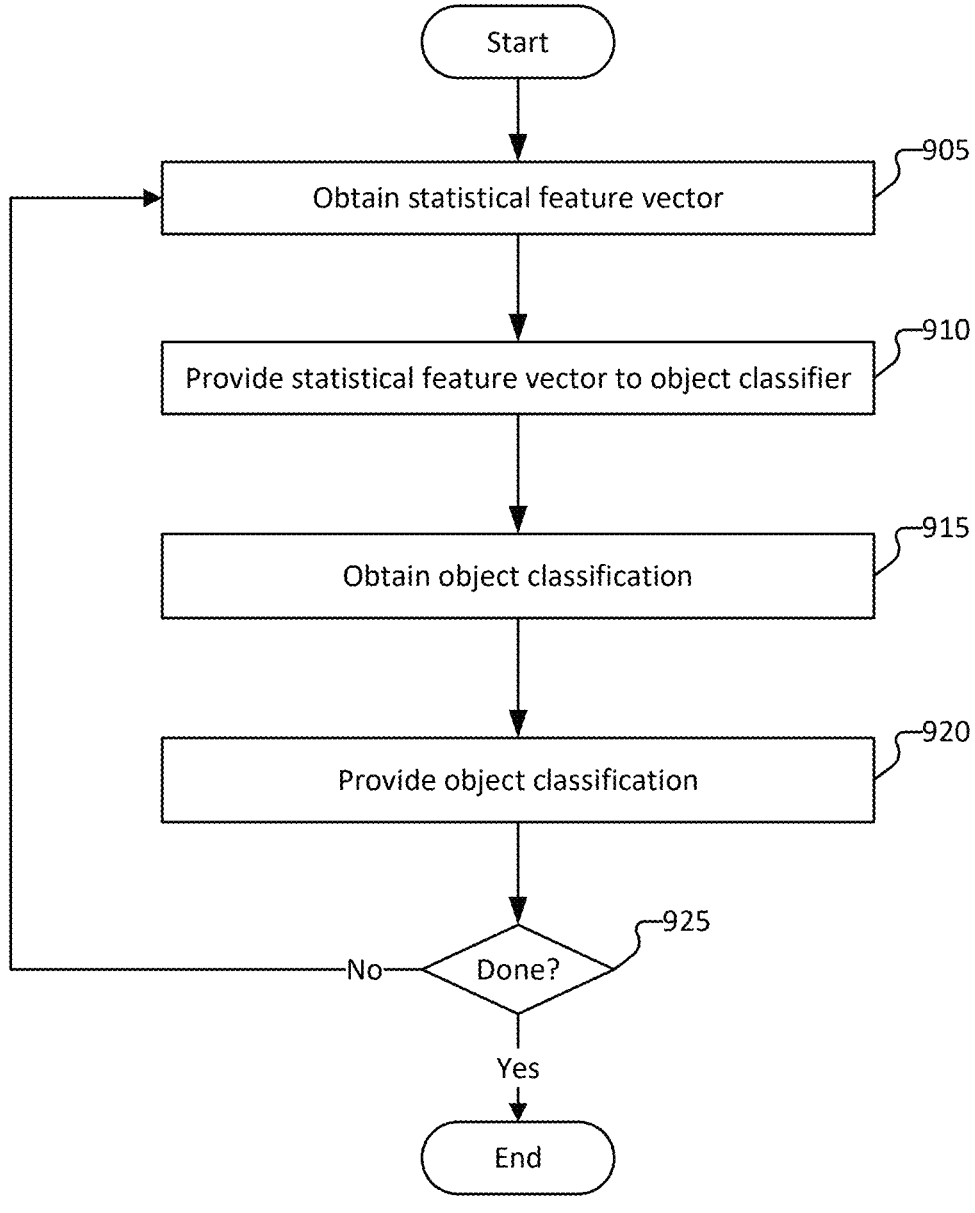
FIG. 9 is a flow diagram of a method for determining an object classification according to various embodiments of the present application.

FIG. 9 is a flow diagram of a method for determining an object classification according to various embodiments of the present application. In some embodiments, process 900 is implemented by system 100 of FIG. 1 and/or system 200 of FIG. 2. In some embodiments, process 900 is invoked by 615 of process 600 of FIG. 6.

At 905, a statistical feature vector is obtained. In some embodiments, the statistical feature vector is obtained from 820 at process 800 of FIG. 8. At 910, the statistical feature vector is provided to an object classifier. At 915, an object classification is obtained. For example, the object classifier compares the statistical feature vector to predefined object templates stored in a template library (e.g., object templates may correspond to statistical feature vectors representing predefined sample objects). As another example, the object classifier is a machine learning model and the object classifier provides a prediction of the object classification. At 920, the object classification is provided. In some embodiments, the system provides the object classification to a system or service that invoked process 900. The object classification may be provided to another system or service that is used in connection with implementing active measures to be implemented based on the object classification. At 925, a determination is made as to whether process 900 is complete. In some embodiments, process 900 is determined to be complete in response to a determination that the classifying of objects within sensor data is complete, no further objects are to be detected/matched, no further statistical feature vectors are to be analyzed, a user has exited the system, an administrator indicates that process 900 is to be paused or stopped, etc. In response to a determination that process 900 is complete, process 900 ends. In response to a determination that process 900 is not complete, process 900 returns to 905.

Figure 10:
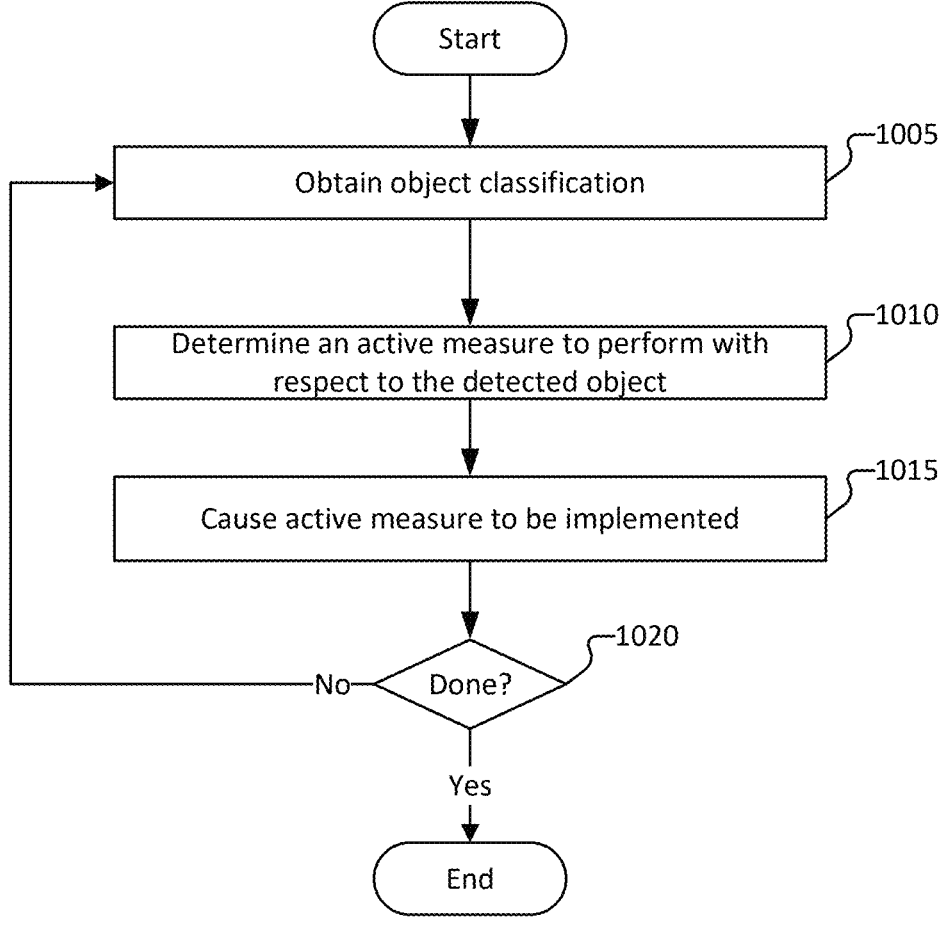
FIG. 10 is a flow diagram of a method for performing an active measure based on an object classification according to various embodiments of the present application.

FIG. 10 is a flow diagram of a method for performing an active measure based on an object classification according to various embodiments of the present application. In some embodiments, process 1000 is implemented by system 100 of FIG. 1 and/or system 200 of FIG. 2. Process 1000 may be implemented in response to detecting an object or in response to obtaining an object classification for sensor data.

At 1005, an object classification is obtained. In some embodiments, the object classification is obtained from 620 of process 600 or 920 of process 900.

At 1010, the system determines an active measure to perform with respect to the detected objects. In some embodiments, the system determines the active measure to be implemented based on the object classification (e.g., a type or identifier of the one or more objects that are classified in the sensor data). The system may determine the active measure based on a mapping of objects or types of objects to active measures to be implemented. Examples of active measures include sending a notification of a detected object(s) (e.g., to another system or service), causing an interceptor to be deployed to intercept or approach the object(s), causing the object(s) to be eliminated, causing a communication to be sent to the object(s), etc. In the case of multiple objects being detected in the sensor data, the system may prioritize the active measures to be implemented based on relative priorities of the detected objects.

In some embodiments, the relative priorities are set according to one or more policies (e.g., a priority policy). The one or more policies may be defined to set a priority based on a location of the object, a type of the object, an identifier of the object, etc. For example, in the case of malicious objects, the system may determine that a closer/closest object has a higher relative priority for intercept than a relative priority for another object that is further away.

At 1015, the system causes the active measure to be implemented. For example, the system communicates an indication of the active measure to be implemented or an instruction for the active measure to be implemented. The system may send a control signal to one or more other systems or services.

At 1020, a determination is made as to whether process 1000 is complete. In some embodiments, process 1000 is determined to be complete in response to a determination that the active measure is successfully implemented, no further active measures are to be performed, no further objects are detected, a user has exited the system, an administrator indicates that process 1000 is to be paused or stopped, etc. In response to a determination that process 1000 is complete, process 1000 ends. In response to a determination that process 1000 is not complete, process 1000 returns to 1005.

Various examples of embodiments described herein are described in connection with flow diagrams. Although the examples may include certain steps performed in a particular order, according to various embodiments, various steps may be performed in various orders.

Figures 11A, 11B:
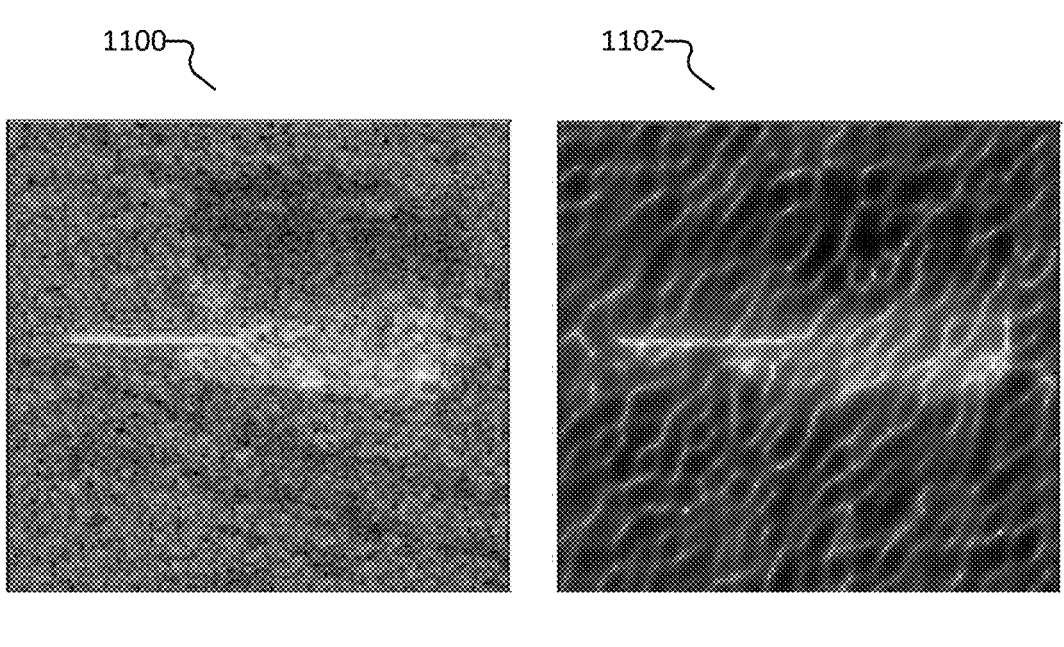
FIGS. 11A and 11B are images illustrating examples of input data and processed data, respectively, for a system for determining a statistical feature vector.

FIGS. 11A and 11B are images illustrating examples of input data and processed data, respectively, for a system for determining a statistical feature vector. In some embodiments, the input data are provided to system 100 or FIG. 1 and/or system 200 of FIG. 2. In the examples shown in FIG. 11A and FIG. 11B, SAR image data 1100 of a tank and a corresponding statistical feature vector image 1102 are displayed. Note that complex valued statistical feature vectors exploit the inherent redundancy in SAR data, which is a result of the holographic nature of complex SAR images. The statistical feature vector is 1-2 orders of magnitude smaller in size (also in bytes) than the original SAR image data, yet retains the most important information, a form of coherent data compression. Image 1102 is a mathematically interpolated 'image' using only the small size statistical feature vector as input to the interpolation function-interpolation is chosen to make it the same size as SAR image data 1101, the full-size image, and both displayed for comparison. This type of coherent data compression forms a subspace that can be leveraged for synthetic image generation, as in image 1102, or automatic target recognition-based machine learning algorithms. The method to produce the statistical feature vector involves use of a MWF, a data-driven, linear adaptive filter. The MWF structure is a reduced-rank adaptive filter that converges very quickly in terms of the number of data training samples.

Figure 11C:
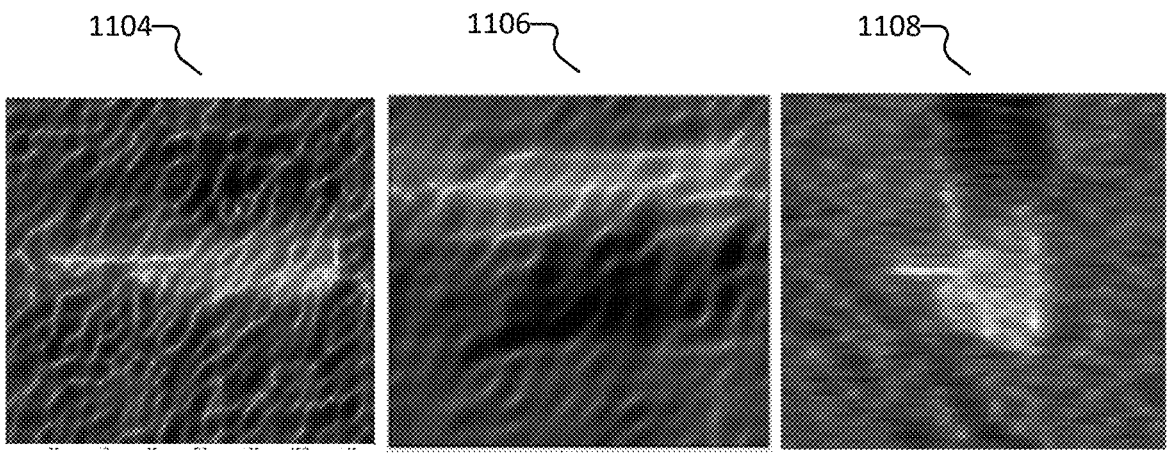
FIG. 11C is a set of images illustrating an embodiment of a set of known objects in a library.

FIG. 11C is a set of images illustrating an embodiment of a set of known objects in a library. In some embodiments, the library of images of FIG. 11C are used for object recognition for FIG. 11B. In the example shown, a classifier might select library object statistical feature vector 1104 over library object statistical feature vector 1106 or library object statistical feature vector 1108. In some embodiments, a matching value for library object statistical feature vector 1104 is greater than the matching value for library object statistical feature vector 1106 or library object statistical feature vector 1108. In some embodiments, a matching value for library object statistical feature vector 1104 is greater than a matching threshold, whereas the matching value for library object statistical feature vector 1106 or library object statistical feature vector 1108 are less than the matching threshold.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
       obtain sensor data;
       transform the sensor data to a phase history domain representation;
       sample the phase history domain representation using a predefined matrix;
       generate a datacube based on output from the sampling of the phase history domain representation using the predefined matrix;
       transform the datacube to obtain a statistical feature vector representing the sensor data, wherein the datacube is transformed based at least in part on processing the datacube using a Multistage Wiener Filter (MWF);
       perform an object detection and/or classification based at least in part on analyzing the statistical feature vector using a machine learning model; and
       provide an indication of the object detection and/or classification; and
   a memory coupled to the one or more processors and configured to provide the one or more processors with instructions.

2. The system of claim 1, wherein the sensor data comprises synthetic aperture radar data.

3. The system of claim 1, wherein the processing the datacube using the MWF comprises determining one or more projections of the datacube based at least in part on one or more predefined steering vectors.

4. The system of claim 1, wherein the sampling the phase history domain representation using the predefined matrix includes to:

position the predefined matrix over the phase history domain representation; and
    obtain a set of phase history values for the sensor data at locations at which the predefined matrix overlays the phase history domain representation.

5. The system of claim 4, wherein the sampling the phase history domain representation using the predefined matrix includes iteratively sampling regions of the sampled phase history domain representation by positioning the predefined matrix over a region of the phase history domain representation and obtaining associated phase history values based on the positioning of the predefined matrix until all regions have been sampled.

6. The system of claim 1, wherein the processing the datacube using the MWF comprises truncating a filtering based on the MWF to cause a size of expected resultant data to match a filter order of the MWF.

7. The system of claim 1, wherein the object detection and/or classification is provided contemporaneous with collection of the sensor data to provide tracking.

8. The system of claim 1, wherein performing the object classification includes comparing the statistical feature vector to object data comprised in a template library.

9. The system of claim 8, wherein the performing the object classification further includes detecting an object in the sensor data in response to determining that the statistical feature vector matches a sample of the object data comprised in the template library.

10. The system of claim 9, wherein the sensor data is associated with one or more objects.

11. The system of claim 9, wherein the sample of the object data corresponds to a statistical feature vector for a particular object.

12. The system of claim 9, wherein the template library comprises samples of object data for a plurality of different objects.

13. The system of claim 9, wherein the template library comprises samples of object data for a particular object.

14. The system of claim 1, wherein processing the datacube using the MWF comprises transforming resultant data output from the MWF into the statistical feature vector.

15. The system of claim 1, wherein the one or more processors are further configured to perform a rotation or scaling of the sensor data or the datacube before transforming the datacube.

16. The system of claim 15, wherein rotating or scaling the sensor data or the datacube is based on an alignment of samples of object data in a template library to which the statistical feature vector is compared.

17. The system of claim 16, wherein the alignment has a preferred axis.

18. The system of claim 16, wherein the scaling is based at least in part on a normalized scale size.

19. The system of claim 1, wherein:
    raw data collected by one or more sensors or an image formed from the raw data is sliced into a set of data slices; and
    the sensor data that is processed to generate the datacube corresponds to a single data slice from the set of data slices.

20. The system of claim 19, wherein:
    performing the object classification includes comparing the statistical feature vector to object data comprised in a template library; and
    a plurality of the set of data slices are subject to parallel processing to perform object classification based on respective statistical feature vectors that are obtained based on transforming respective datacube data corresponding to the plurality of the set of data slices.

21. The system of claim 1, wherein the indication of the object classification is used in connection with computer vision for autonomous navigation.

22. The system of claim 1, wherein values comprised in the statistical feature vector are characterized by values of weights, a set of predefined steering vectors, and null spaces for the set of predefined steering vectors.

23. The system of claim 1, wherein the one or more processors are further configured to:

train a model to perform the object classification.

24. The system of claim 23, wherein the model is a machine learning model.

25. A method, comprising:

obtaining, by one or more processors, sensor data;

transforming the sensor data to a phase history domain representation;

sampling the phase history domain representation using a predefined matrix;

generating a datacube based on output from the sampling of the phase history domain representation using the predefined matrix;

transforming the datacube to obtain a statistical feature vector representing the sensor data, wherein the datacube is transformed based at least in part on processing the datacube using a Multistage Wiener Filter (MWF);

performing an object detection and/or classification based at least in part on analyzing the statistical feature vector using a machine learning model; and providing an indication of the object detection and/or classification.

26. A non-transitory computer readable medium comprising computer instructions for:

obtaining, by one or more processors, sensor data;

transforming the sensor data to a phase history domain representation;

sampling the phase history domain representation using a predefined matrix;

generating a datacube based on output from the sampling of the phase history domain representation using the predefined matrix;

transforming the datacube to obtain a statistical feature vector representing the sensor data, wherein the datacube is transformed based at least in part on processing the datacube using a Multistage Wiener Filter (MWF);

performing an detection and/or object classification based at least in part on analyzing the statistical feature vector using a machine learning model; and providing an indication of the detection and/or object classification.

* * * * *